(12) United States Patent
Tango

(10) Patent No.: US 6,644,562 B2
(45) Date of Patent: Nov. 11, 2003

(54) DYNAMIC COUNTERWEIGHT MECHANISM FOR ONE-SIDED SPRAYERS

(75) Inventor: Airton Hiroto Tango, Pompeia (BR)

(73) Assignee: Maquinas Agricolas Jacto S.A., Pompeia (BR)

(*) Notice: Subject to any disclaimer, the term of this patent is extended or adjusted under 35 U.S.C. 154(b) by 10 days.

(21) Appl. No.: 10/113,775

(22) Filed: Apr. 1, 2002

(65) Prior Publication Data

US 2003/0192961 A1 Oct. 16, 2003

(51) Int. Cl.[7] .................................................. B05B 1/20
(52) U.S. Cl. ........................ 239/159; 239/146; 239/164; 239/166; 239/172; 212/196
(58) Field of Search ................................ 239/159, 169, 239/168, 172, 148, 149, 146, 147, 164, 166, 161, 163, 167, 14.1, 14.2; 212/195, 196, 197

(56) References Cited

U.S. PATENT DOCUMENTS 3,815,478 A * 6/1974 Axelsson et al. ............. 91/497
5,904,165 A * 5/1999 McLean et al. ............. 134/172
5,954,270 A * 9/1999 Rosset ......................... 239/159

* cited by examiner

*Primary Examiner*—Michael Mar
*Assistant Examiner*—Dinh Q. Nguyen
(74) *Attorney, Agent, or Firm*—Michael J. Striker

(57) ABSTRACT

A dynamic counterweight mechanism for one-sided sprayers is vertically fastened to a chassis of a conventional sprayer with a fixed frame (3) so as to move up and down in relation to the frame (3). The mechanism includes a sliding frame (20) that laterally sustains a counterweight module (30). A swinging module (40) is pivotally assembled on the opposite side (23) of the sliding frame (20) and rotates around a bearing (24, 43) and in relation to the sliding frame (20). The upper end of the swinging module (40) is connected to the counterweight module (30) by a steel cable (33), which, in turn, has a counterweight block (32) that moves up and down, due to displacement of the swinging module (40). The steel cable (33) extends through a set of sheaves (50, 51, 52, 53) between the swinging module (40) and the sliding frame (20).

8 Claims, 5 Drawing Sheets

DYNAMIC COUNTERWEIGHT MECHANISM FOR ONE-SIDED SPRAYERS

BACKGROUND OF THE INVENTION

The present invention relates generally to a dynamic counterweight mechanism for one sided sprayers and, more particularly, relates to a dynamic counterweight mechanism for such one-sided sprayers used with air assistance on creeping, vine plants, or creepers, such as potatoes, pumpkins, melons, and vegetable in general, where it is not possible to enter the plant rows due to the crop's characteristics, for example, crops on flooded ground.

As is known in the current state of the art, tractors that must pass through the tracks for vehicles in general pull the one-sided boom sprayers. In this manner, these spray booms must have a length equivalent to two consecutive tracks, which generates a balance problem on the tractor and spray-boom assembly.

Because this one-sided sprayer lacks a spray boom on the opposite side of the sprayer, in order to obtain a counter-balancing of the assembly, a non-adjustable block-shaped counterweight is typically provided on the opposite side of the sprayer. This counterweight is positioned oppositely to the spray boom to eliminate the unbalance and minimize the moment force between the boom and the vehicle that pulls the boom.

Therefore, one object of the present invention is to provide a dynamic counterweight mechanism for one-sided sprayers that ensures an adequate balance of the spray boom, which prevents the sprayer from turning over.

Another purpose of the present invention is to provide a dynamic counterweight mechanism for one-sided sprayers that allows a permanent and constant compensation of the angular variation between the spray boom and the ground, thereby always ensuring a parallelism between them.

A further object of the present invention is to provide a dynamic counterweight mechanism for one-sided sprayers that allows the balance standard or level made between the counterweight and the spray boom to adjust itself, maintaining it always at a preset level relative to the ground.

Yet another purpose of the present invention is to provide a dynamic counterweight mechanism for one-sided sprayers that allows a significant reduction of the counterweight mass.

Thus, a main purpose of the present invention is to provide a dynamic counterweight mechanism for one-sided sprayers that can meet the need for spraying creepers with the assistance of long booms assembled in balance on just one side of the spraying implement.

SUMMARY OF THE INVENTION

These are other purposes and advantages of the present invention are attained with a dynamic counterweight for one-sided sprayers that is based on a conventional sprayer, consisting of a chemical tank, a pump for the circulation of the chemical mixture stored in the tank, and a hydraulic pump that actuates a structural system formed by a frame and booms. All of these components are disposed on a chassis. This system must be balanced by the counterweight. According to the present invention, the counterweight mechanism is consisted of rigid columns vertically fastened to the chassis, on which a fixed vertical frame is mounted, on which a frame slides up-and-down, laterally sustaining a counterweight module. The counterweight module is defined by a pair of vertical guides set in a parallel manner and spaced from one another, with a counterweight assembled in a sliding way in the space between them. On the opposite side of the sliding frame, a swinging module is assembled pivotally, defined by a vertical profile, and having a supporting base comprising horizontal profiles, while the vertical profile is fitted medially in a bearing in the vertical part of the sliding frame. The swinging module rotates around this bearing and in relation to the sliding frame and has its upper end interconnected to the counterweight module. The counterweight block of the counterweight module moves up and down due to the displacement of the swinging module. The suspended counterweight block is sustained by a steel cable that is faxed on its upper wall and extended by a set of sheaves between the swinging module and the sliding frame, thereby allowing the steel cable to run about the set of pivoted sheaves on the sliding frame and on the swinging module to multiple the nominal weight of the counterweight block acting on the longer spray boom.

The counterweight module comprises at least a traction spring, having one end connected to the swinging module, while on its opposite end, it is connected to a traction-adjusting threaded shaft, which, in turn, is held on the sliding frame. The swinging module has an angular displacement that is deadened by progressive action cushions fitted on the sliding frame. The inventive dynamic counterweight mechanism further includes a quadrangular structure, which is held by the horizontal profiles as a supporting base of the swinging module, in addition to being pivotally retained to the vertical profile through a vertical shaft disposed thereon. The quadrangular structure is subjected to rotating or moving angularly around this shaft, according to a transversal plane in relation to the swinging module. The angular displacement of the quadrangular structure is also deadened on its ends by rubber cushions.

DETAILED DESCRIPTION OF THE PREFERRED EMBODIMENTS

As shown in the accompanying figures, the dynamic counterweight mechanism for one-sided sprayers, according to the present invention, is applied to a convention sprayer (FIG. 1), which consists of a chemical tank (not shown), a pump 1 for the circulation of the chemical mixture stored in the tank, a hydraulic pump (also not shown) for actuating a structural system formed by a fixed vertical frame 3, and the spray boom 4, which must be balanced by the counterweight mechanism. All of the above-described components are disposed on a chassis 2.

Figure 2:
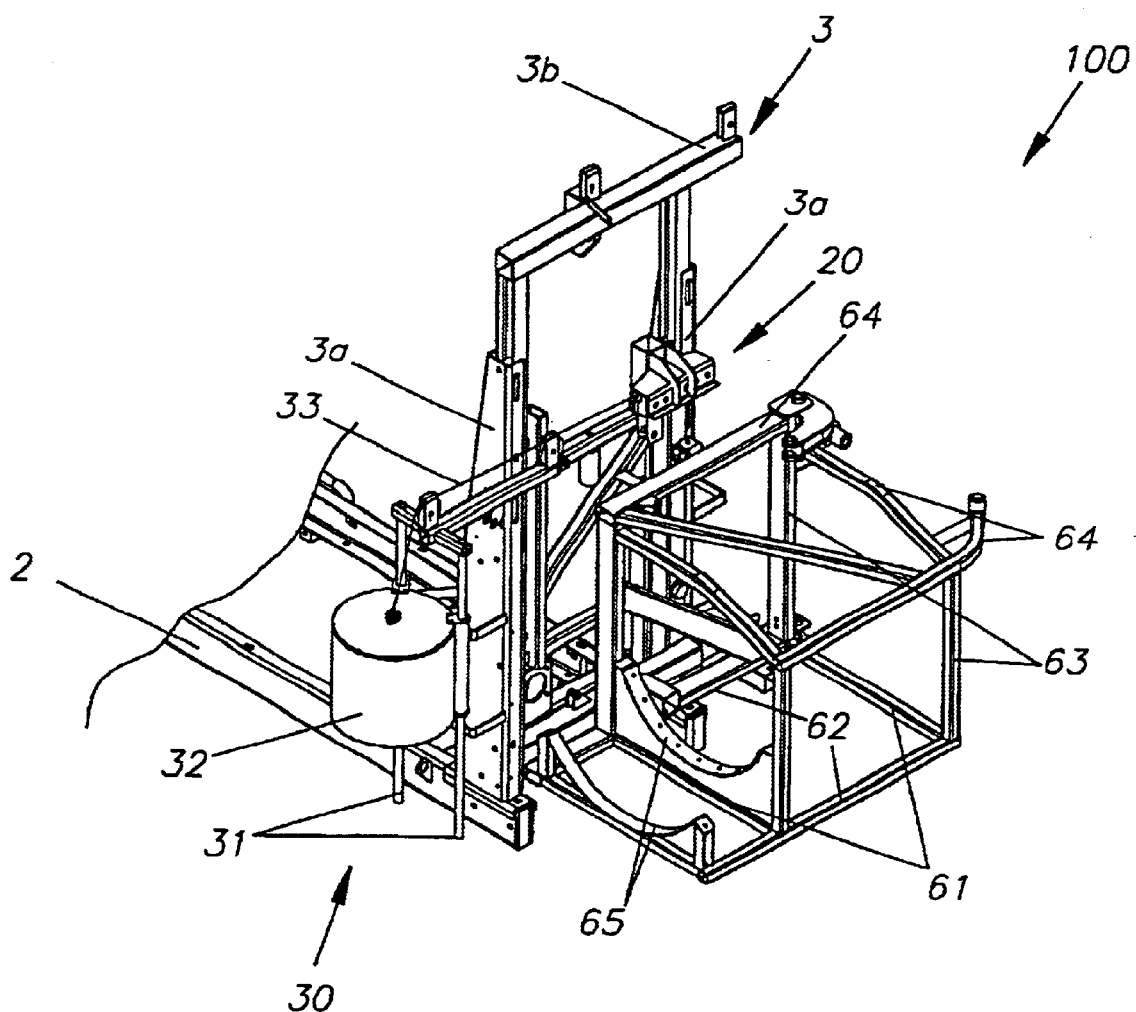
FIG. 2 is an enlarged and detailed perspective view of the dynamic counterweight mechanism of the present invention.

As shown in FIG. 2, the fixed frame 3 includes a pair of rigid columns 3a vertically fastened to the chassis 2. On an upper end of the columns 3a, an upper fixed crossbeam 3b is assembled, so that the dynamic counterweight mechanism 100 for one-sided sprayers is able to move up and down on this fixed frame 3.

The dynamic counterweight mechanism 100 includes a sliding frame 20, having an upper crossbeam 21 longer than its lower crossbeam 22. On an end of the mechanism 100, a counterweight module 30 is defined by a pair of vertical guides 31 arranged parallel to one another and spaced from one another. A counterweight 32 is disposed slidingly in the space between the vertical guides 31, the counterweight 32 sustained by a steel cable 33, which will be described in greater detail below.

Figure 3:
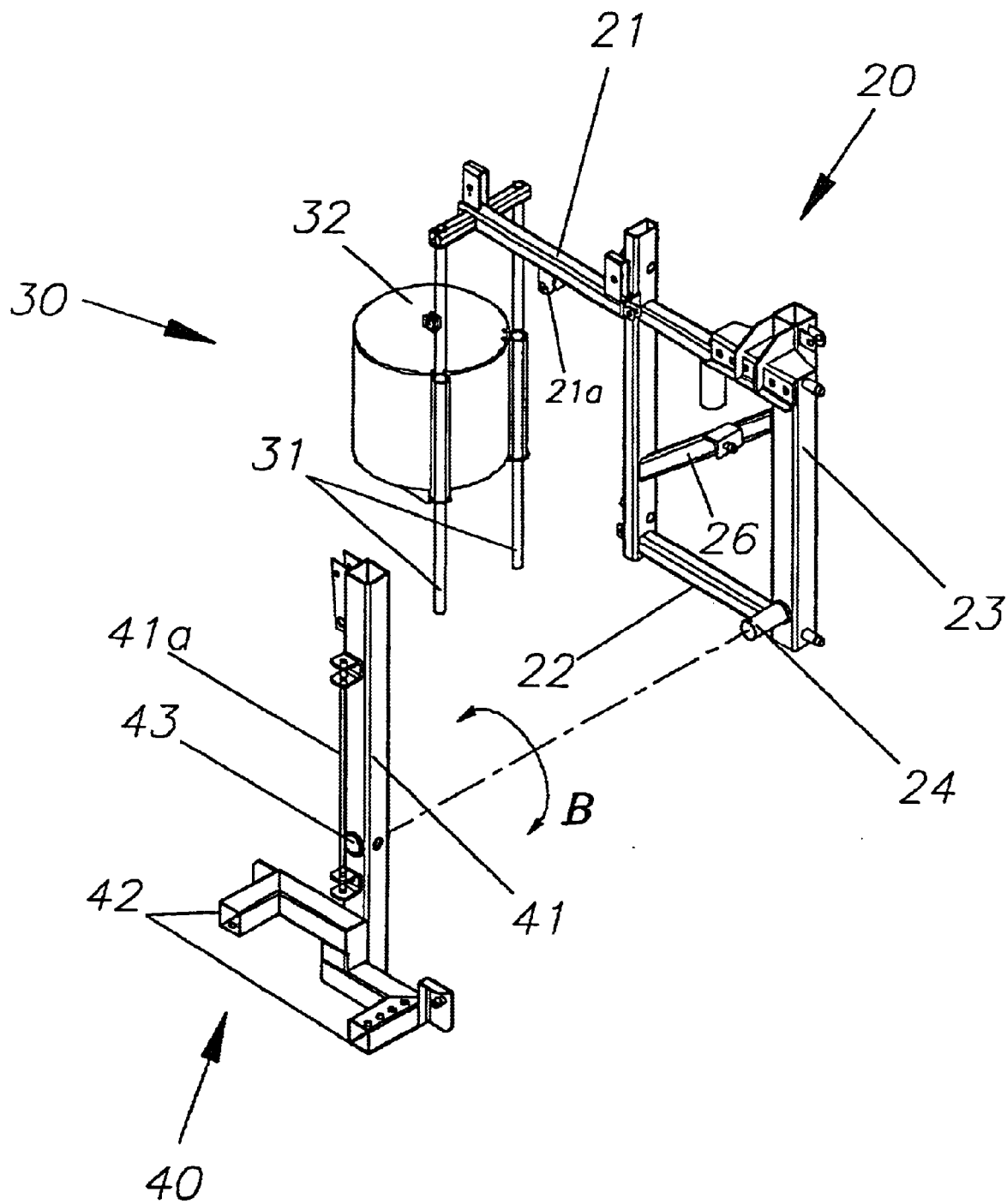
FIG. 3 is an exploded, perspective view of isolated parts of the dynamic counterweight mechanism of the present invention.

On a vertical portion 23 of the sliding frame 20, opposite to the side at which the counterweight module 30 is disposed, a swinging module 40 is assembled pivotally and is defined by a vertical profile 41 having horizontal profiles, or scrapers, arranged underneath as a supporting base 42. The vertical profile 41 has medially arranged bearing hole 43, in which a shaft 24 is fitted, the shaft disposed on the vertical part 23 of the sliding frame 20. In this manner, the swinging module 40 is subject to rotating around the bearing formed by the hole 43 and shaft 24, in relation to the sliding frame 20, as shown by arrow "B" in FIG. 3. The upper end of the profile 41 is interconnected to the counterweight module 30 through the steel cable 33, so that the counterweight 32 itself moves up and down, due to the displacement of the swinging module 40.

Figure 5:
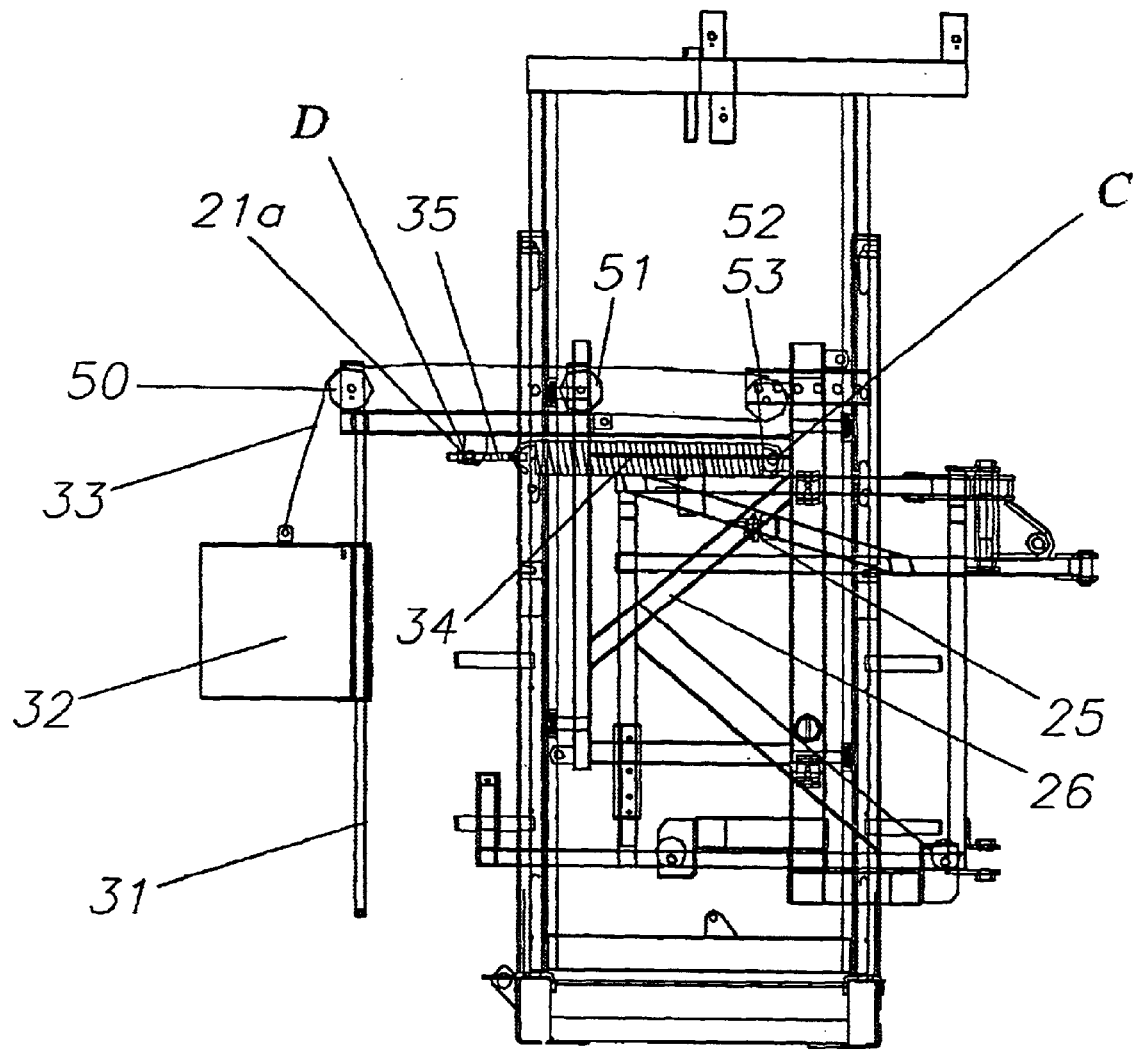
FIG. 5 is a posterior view of the dynamic counterweight mechanism for one-sided sprayers, according to the present invention, taken along the view indicated by the arrow "A" in FIG. 4.

As noted above, the counterweight module 30 includes a counterweight or suspended block 32, which moves up and down through the vertical guides 31 fixed on the upper crossbeam end 21 of the sliding frame 20. As shown in FIG. 5, this suspended block 32 is sustained, that is suspended, by a steel cable 33 that is fastened on its upper wall and extended by a set of sheaves 50, 51, 52, 53 between the swinging module 40 and the sliding frame 20. The steel cable's 33 course around the set of pivoted sheaves 50, 51, 52, 53 on the sliding frame 20 and on the swinging module 40 ensures a multiplication of the counterweight block 32 weight, and consequently, enables a longer spray boom 4 to be sustained with a smaller nominal block (see FIG. 1).

The counterweight module 30 comprises, at least, a traction spring 34, having one of its ends interconnected to the swinging module 40, proximate to the upper part of the vertical profile 41. A threaded shaft 35 is connected to the opposite end of the traction spring 34, the threaded shaft 35 being retained in an intermediate point 21 a of the upper crossbeam 21 of the sliding frame 20. With this threaded shaft 35, it is possible to adjust the counterweight module 30 through longer or shorter traction of the helical spring 34.

The angular displacement of the swinging module 40 is deadened by progressive action cushions 25, mounted in an oblique channel 26 fixed on the sliding frame 20.

The dynamic counterweight mechanism 100 also includes a moving quadrangular structure 60 (FIGS. 1, 2, and 4), which is arranged in front of and proximate to the swinging module 40. The quadrangular structure 60 serves to sustain the housing 71 of the axial fan 72, which is part of the air assistance system 70 of the spray boom 4.

Figure 1:
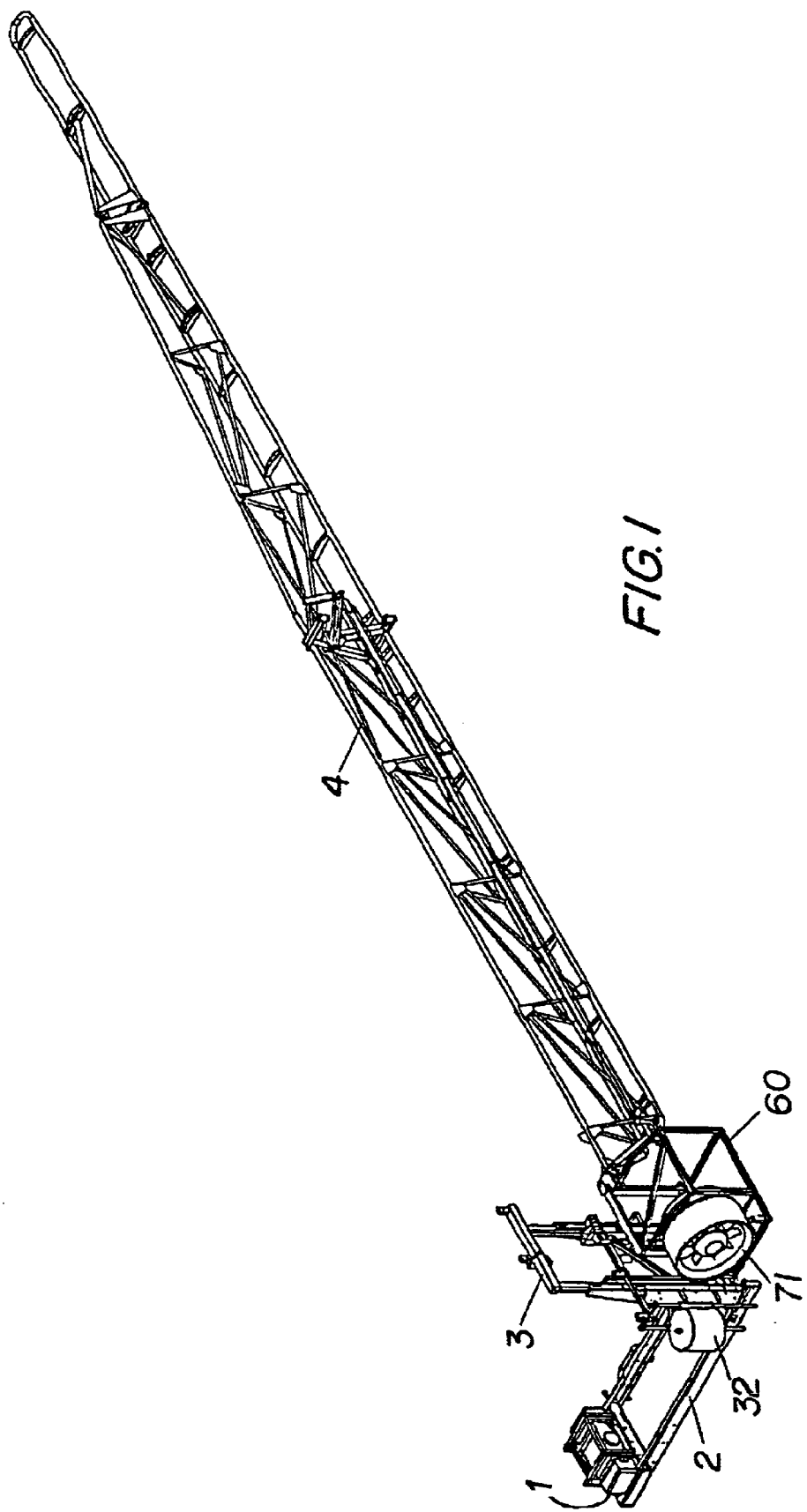
FIG. 1 is a perspective view of a one-sided sprayer employing the dynamic counterweight mechanism of the present invention.
Figure 4:
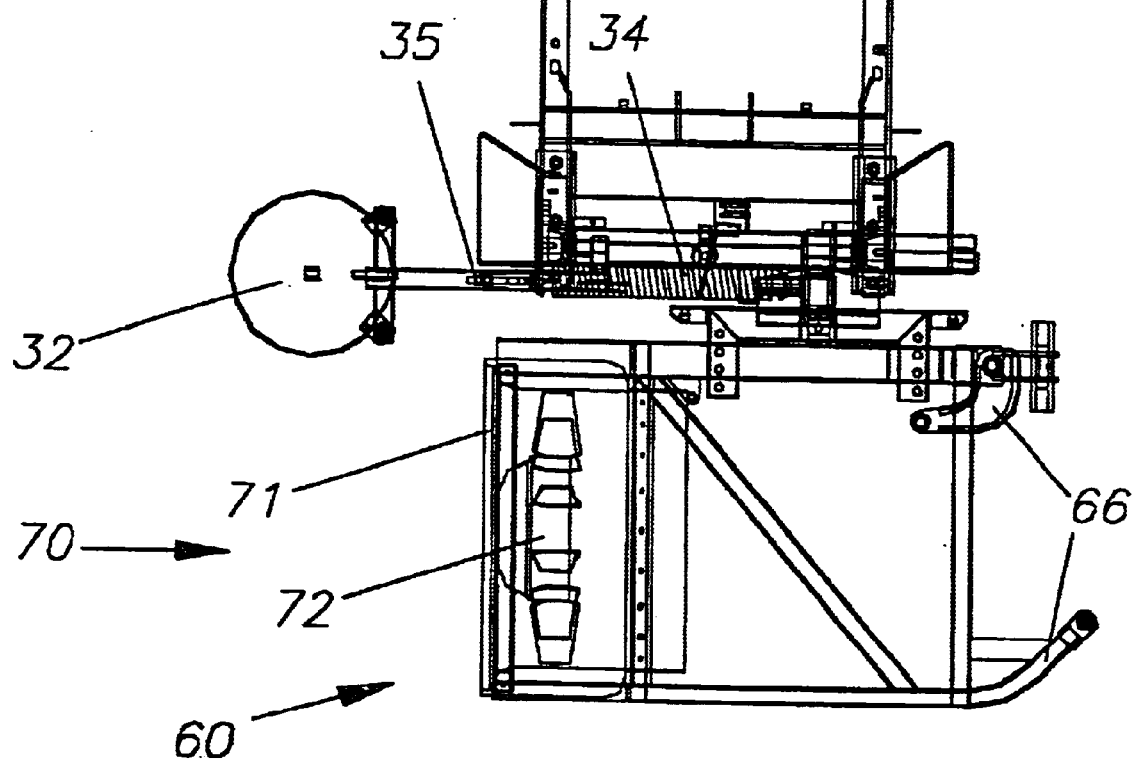
FIG. 4 is a plan view of the dynamic counterweight mechanism of the present invention for one-sided sprayers.

The moving quadrangular structure 60 consists of metallic profiles, forming a cage with three lower crossbeams 61 interconnected to two lower struts 62. Corresponding columns 62, having different heights and which are interconnected to one another by tubular profiles 64, project upwards from the vertex formed by the two struts 62 and two of the three lower crossbeams 61. A concave profile cradle 65 is defined on two of the three lower crossbeams 61 (FIG. 2), on which the air assistance system 70 of the spraying assembly rests. The quadrangular structure 60 is suspended by the horizontal profiles that form the supporting base 42 of the swinging module 40, in addition to being pivotally retained to the vertical profile 41 by means of a vertical shaft 41a. The quadrangular structure 60 is subject to rotation or angular displacement according to a transversal plane in relation to the swinging module 40. This angular displacement of the quadrangular structure 60 is also deadened on its ends by rubber cushions. As shown in FIGS. 1 and 4, ends of the spray boom 4 are mounted on the articulated ends 66 defined on the upper part of the quadrangular structure 60. With this configuration, the dynamic counterweight mechanism for one-sided sprayers operates in such as way so as to prevent the sprayer from becoming unstable due to the differential of forces between the sides of the spraying assembly. With the counterweight module 30, it is possible to have the static moment of one side equal to the other in relation to the bearing point 24, 43 of the mechanism 100, without the need to use a larger block as a counterweight 32.

Another advantage provided by the inventive dynamic counterweight mechanism 100 is that the stability of the spray boom 4 is ensured by the joint action of the pendular and counterweight system with the deadening system (i.e., the set of cushions), which avoid the impact of the boom 4 against the ground when the implement passes over ground that is not level and uneven. In addition, the boom 4 always operates in a parallel plan to the ground for an effective and adequate spraying of the ground. This feature is made possible due to the pendular effect of the mechanism 100, acted upon by the swinging module 40, which has freedom of rotation about the bearing point 24, 43, and which carries with it the spray boom 4 and the counterweight module 30.

Another significant advantage of the inventive mechanism 100 is that it is possible to level the spray boom 4 in relation to the ground while in its static condition. The adjustment of this level is defined for different conditions of the ground and/or relief, by adjusting the intensity of the spring 34 force, where this adjustment is defined by the locking screw 35 disposed proximate the traction. spring 34.

Providing a set of sheaves 50, 51, 52, 53 for guiding and conducting the steel cable 33 course allows a multiplying of the net weight of the block counterweight 32 in balance, which is preferably four times the nominal weight. However, other higher or lower values can be obtained, depending on the set of sheaves used. With this nominal weight multiplication of the counterweight, consequently, a reduction of the block required to balance a one-sided spraying assembly is obtained.

The dynamic counterweight mechanism for one-sided sprayers 100, once in motion, causes the swinging module 40 to rotate about the bearing point 24, 43, reducing or increasing the distance between the points "C" and "D", shown in FIG. 5. Because of this action, the counterweight 32 slides along the guides 31, and the spring 34, due to its lengths, experiences variations in its traction force acting on the swinging module 40. When the mechanism 100 swings, causing the boom 4 to ascend, the counterweight 32 descends along the guides 31, and the length of the spring 34 is shortened, thus reducing the traction force acting near the swinging module 40. With less force acting on the swinging module 40, the swinging module tends to make an opposite movement and returns to the original position. The opposite movement follows the same principle, that is, a swing that causes the boom 4 to descend, in turn, causes the counterweight 32 to ascend along the guides 31 and extends the length of the spring 34, thereby increasing the force on the swinging module 40 and causing the system to return to the original position. As previously mentioned, the swings of the mechanism 100 are deadened by progressive cushions, which allow the swinging movements to stop, causing the boom 4 to return to its original, stable position.

It will be understood that each of the elements described above, or two or more together, may also find a useful application in other types of constructions differing from the types described above.

While the invention has been illustrated and described herein as dynamic counterweight mechanism for one-sided sprayers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. Dynamic counterweight mechanism for one-sided sprayers, wherein said one-sided sprayer is balanced by a counterweight, comprising:

a fixed frame (3) vertically secured to a chassis (2) of said one-sided sprayer, wherein said mechanism is vertically moveable in said fixed frame; p1 a sliding frame (20) laterally suspending a counterweight module (30) on one side of the sliding frame (20), said sliding frame having a plurality of cushions (25);

a spray boom assembly (4) having an air assistance system (70);

a swinging module (40) pivotally arranged on a side of the sliding frame (20) opposite to said counterweight module (30) and rotatable about a bearing (24, 43), said swinging module (40) defined by a vertical profile (41) having a supporting base comprising horizontal profiles (42), wherein said swinging module (40) has an upper end, said upper end connected to the counterweight module (30) by a steel cable (33), said steel cable (33) suspending a counterweight block (32), said counterweight block (32) moveable in a vertical direction by displacement of the swinging module (40), wherein said steel cable (33) extends through a set of sheaves (50, 51, 52, 53) arranged between the swinging module (40) and the sliding frame (20);

said counterweight module (30) comprising an adjustable traction spring (34, 35) having opposite ends, wherein one end of said traction spring (34, 35) is connected to the swinging module (40) and another end of the traction spring (34, 35) is connected to the sliding frame (20, 21), wherein said swinging module (40) has an angular displacement, wherein said angular displacement is deadened by said cushions on said sliding frame (20);

a moveable quadrangular structure (60) arranged in front of and proximate to the swinging module (40), wherein said quadrangular structure (60) sustains said air assistance system (70), said quadrangular structure (60) suspended by the horizontal profiles (42) of the supporting base of the swinging module (40) and pivotally retained to said vertical profile (41) by means of a vertical shaft (41a) disposed on said profile (41), wherein the quadrangular structure (60) rotates or move angularly about the vertical shaft (41a) according to a transversal plane in relation to the swinging module (40), and wherein an angular displacement of the quadrangular structure (60) is deadened by said cushions (25).

2. Dynamic counterweight mechanism for one-sided sprayers as defined in claim 1, wherein the sliding frame (20) has an upper crossbeam (21) and a lower crossbeam (22), wherein said upper crossbeam (21) is longer than the lower crossbeam (22), wherein the counterweight module (30) is arranged on said upper crossbeam (21) and defined by a pair of parallel and spaced apart vertical guides (31), and wherein said counterweight block (32) is slidingly mounted between said vertical guides and suspended by a steel cable (33).

3. Dynamic counterweight mechanism for one-sided sprayers as defined in claim 2, wherein the sliding frame (20) has a vertical part (23) opposite to the counterweight module (30), said vertical part (23) having a shaft (24), wherein said swinging module (40) is pivotally arranged on said vertical part (23), and wherein said vertical profile (410) has a medially disposed bearing hole (43) for receiving said shaft (24), thereby forming a bearing, whereby the swinging module (40) is rotatable about the bearing in relation to the sliding frame (20).

4. Dynamic counterweight mechanism for one-sided sprayers as defined in claim 2, wherein an upper end of the profile (41) is connected to the counterweight module (30) by the steel cable (33), whereby the counterweight (32) is moveable in a vertical direction upon the displacement of the swinging module (40).

5. Dynamic counterweight mechanism for one-sided sprayers as defined in claim 1, wherein the suspended counterweight block (32) is held by a steel cable (33), wherein said steel cable (33) extends through a set of sheaves (50, 51, 52, 53) between the swinging module (40) and the sliding frame (20), whereby a multiplying of a weight of said counterweight block (32) occurs to enable sustaining of a longer spray boom (4) with a smaller nominal block.

6. Dynamic counterweight mechanism for one-sided sprayers as defined in claim 1, wherein said another end of the traction spring (34) is connected to a threaded shaft (350), said threaded shaft retained in an intermediate portion (21a) of an upper crossbeam (21) of the sliding frame (20), whereby said counterweight module is adjustable by means of the threaded shaft and lengthening or shortening of the traction spring (34).

7. Dynamic counterweight mechanism for one-sided sprayers as defined in claim 1, wherein the cushions (25) are mounted in an oblique channel (26) fixed on the sliding frame (20).

8. Dynamic counterweight mechanism for one-sided sprayers as defined in claim 1, wherein said air assistance system (70) includes an axial fan housing (71), wherein said quadrangular structure (60) sustains said axial fan housing (71), said quadrangular structure (60) comprising metallic sections, said sections forming a case having three lower crossbeams (61) connected to two lower struts (62), wherein said lower struts (62) and two of the three lower crossbeams form a vertex, wherein columns (63) project upwardly from said vertex, said columns (63) having different heights, wherein said columns (63) are connected to one another by tubular profiles (64), wherein two of said three lower crossbeams (61) have a concave profile cradle (65), and wherein the air assistance system (70) rests on said concave profile cradles.

* * * * *